UNITED STATES PATENT OFFICE.

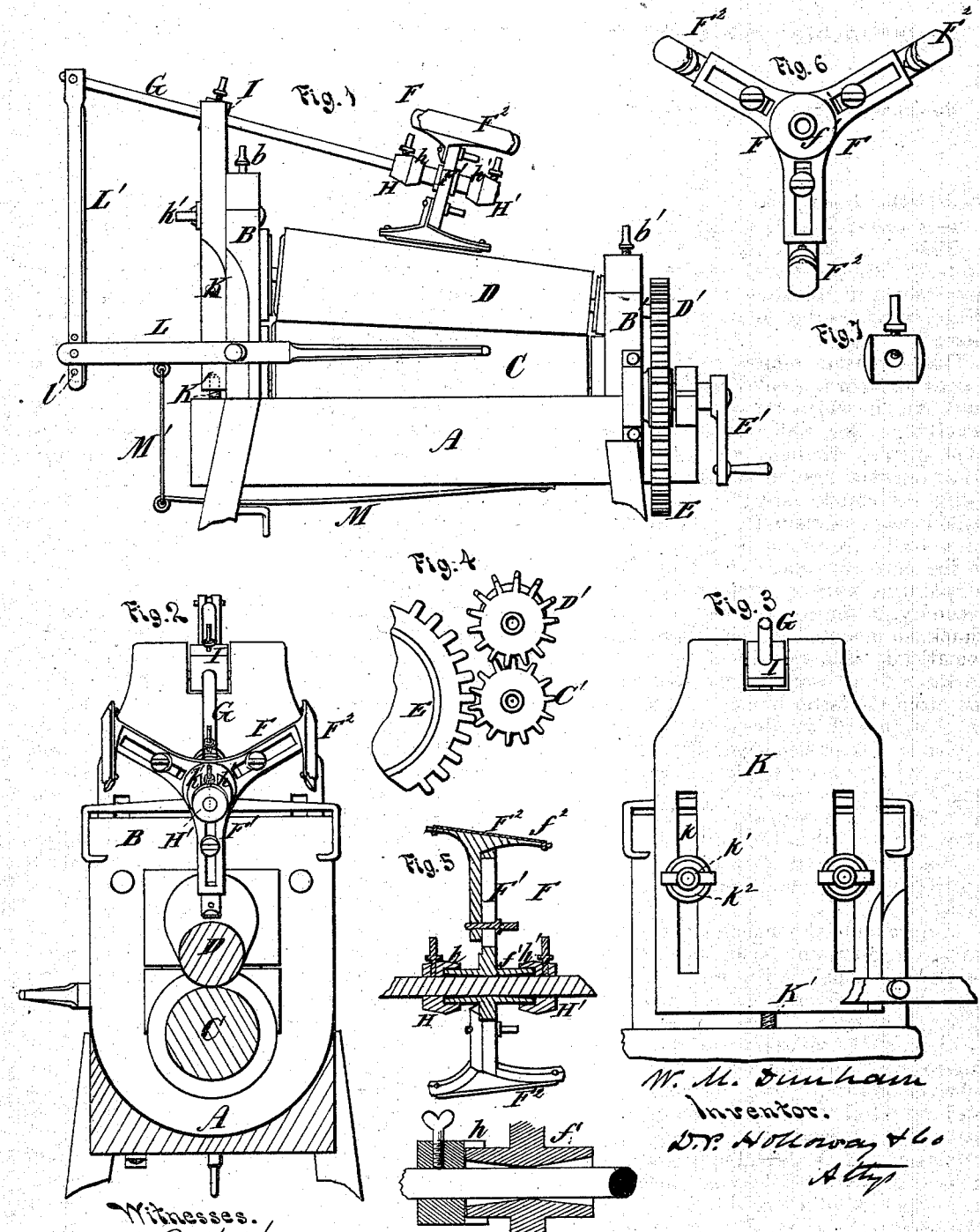

WILLIAM M. DUNHAM, OF MOLINE, ILLINOIS, ASSIGNOR TO JOHN M. GOULD, OF SAME PLACE.

IMPROVEMENT IN MACHINES FOR PAINTING BUCKETS AND OTHER HOLLOW-WARE.

Specification forming part of Letters Patent No. 146,517, dated January 20, 1874; application filed November 13, 1873.

*To all whom it may concern:*

Be it known that I, WILLIAM M. DUNHAM, of Moline, in the county of Rock Island and State of Illinois, have invented certain Improvements in Machines for Painting Hollow Ware, of which the following is a specification:

This invention relates to that class of machines for painting hollow-ware, such as pails, tubs, &c., in which the paint is applied by a revolving roller, which turns the article operated upon by frictional contact. My improvement consists, first, in making the spindle carrying the chuck used for the support of the hollow ware adjustable, both vertically and horizontally, so that it can be readily arranged to the best advantage to adapt the machine for painting ware of different sizes and tapers; secondly, in the construction of an expansion-chuck, so mounted on the spindle that, by automatically adjusting itself to inequalities of surface of the ware it may support, it will maintain the latter in constant contact its entire length with the distributing paint-roller.

Figure 1 is an elevation of my improved machine. Fig. 2 is a vertical transverse section. Fig. 3 is an end view of the same. Figs. 4 to 8 are detail views of detached parts, hereinafter more specifically referred to.

The same letters of reference are used in all the figures in the designation of identical parts.

The frame of the machine carries a suitable trough or fountain, A, for the reception of the paint or varnish. Housings B and B' are mounted on the respective ends of the fountain, carrying the sliding boxes in which the journals of the fountain-roller C and distributing-roller D are supported. The rollers are of tapering form, the former having a metallic and the latter an elastic rubber or cloth surface. The journals at the lesser ends of the rollers project through their bearings, and are geared together by the cog-wheels C' and D', the former of which meshes into the driver E, operated by a crank, E'. The elastic distributing-roller D can be vertically adjusted to take more or less paint from the fountain-roller by screws $b$ and $b'$, which control the elevation of its journal-boxes. The pail, tub, or other hollow article to be painted or varnished, is slipped upon the chuck F, which is supported and turns on the overhung end of the spindle G. The chuck is composed of a spider, $F^1$, and adjustable arms $F^2$, which stand obliquely to the axis of the spider, to fit within a tapering aperture, and are armed with yielding pads $f^2$ upon their outer sides, so that they will not scratch the interior surface of the article forced upon them, and at the same time hold the same the better. The stems of these arms are secured to the spider by set-screws passing through elongated radial slots in the spider, so that by adjusting the arms $F^2$ to and from the axis thereof the chuck can be contracted and expanded to suit any size of hollow ware. The hole in the hub $f^1$ of the spider fits the spindle neatly at the center, but from that point flares toward each end, as clearly shown in Figs. 5 and 8, the former of which illustrates a horizontal and the latter a vertical section, so that the chuck can have a limited longitudinal play, when stationed on the spindle, by the adjustable collars H and H'. This longitudinal play of the chuck is provided to compensate for any inequality in the surface of the ware operated upon, or for its uneven attachment to the chuck, for the purpose of keeping the surface presented to the distributing-roller always parallel therewith, and must take place in vertical planes only. To this end the collars H and H' are provided with vertical lugs $h$ and $h^1$ respectively, which embrace the ends of the hub $f^1$, and permit vertical oscillation of the chuck only. The spindle G is supported, and after proper adjustment, also secured to the oscillating box I, mounted on the slide K attached to the housing B. This slide has elongated vertical slots $k$, through which bolts $k^1$ fastened to the housing project, carrying thumb-nuts $k^2$ for securing the slide, when adjusted by the screw K', which may be operated by a crank or hand wheel. The outer end of the spindle G is linked to the lever L by the connecting-rod L'. The other end of the lever L is in proper proximity to the crank E', to permit a person turning the latter with one hand to operate the lever with his other hand. By depressing this end of the lever L the chuck F is thrown toward the roller D, and the hollow ware it carries, touching the surface of the roller, is painted as it revolves in frictional contact therewith.

It is essential that the surface of the ware when brought in contact with the roller D, should be exactly parallel to the surface thereof. The spindle G being adjustable both vertically and horizontally, furnishes the opportunity of obtaining an exact parallelism of these surfaces when brought into contact, no matter what the size of the ware or its taper may be. This may also be effected to a limited extent by adjusting the chuck to and from the pivotal point of the spindle.

The machine, as described, may be used either for painting or varnishing hollow ware; and by substituting for the roller D suitably-embossed ones, it may also be used for graining and stamping.

The arm of the lever L, which is connected to the spindle G, is also linked by a rod, M', to a spring, M, so that the moment the operator releases the lever, the spring will recoil and turn the spindle on its fulcrum, throwing up the end carrying the chuck. It is desirable to have the lever always in the same position when at rest, irrespective of the position of the spindle and its pivot-box, and to compensate for their adjustment the connecting-rod L' has a series of holes, l', for the proper adjustment of the arm of the lever connected thereto.

What I claim as my invention, and desire to secure by Letters Patent, is—

1. In combination with the distributing-roller D of a machine for painting, varnishing, graining, and stamping hollow ware, the oscillating spindle G, adjustable both vertically and horizontally, and carrying a suitable chuck, F, substantially as and for the purpose specified.

2. The combination of the spindle G, pivoted box I, slide K, connecting-rod L', and lever L, substantially as and for the purpose specified.

3. The chuck F, whose hub is bored flaring from the center toward each end, in combination with the spindle G and vertical guides $h$ and $h^1$, substantially as and for the purpose specified.

4. The combination of the spindle G, chuck F, and adjustable collars H and H', substantially as and for the purpose specified.

In testimony whereof, I have signed my name to this specification in the presence of two subscribing witnesses.

WILLIAM M. DUNHAM.

Witnesses:
D. C. DIMOCK,
H. W. BARTLETT.